Sept. 30, 1924.  1,510,368

S. G. WINGQUIST

HYDRAULIC COUPLING AND CHANGE SPEED GEAR

Filed July 14, 1922    2 Sheets-Sheet 1

Inventor:
Sven Gustaf Wingquist
By his Attorneys,
Fraser, Turk & Myers

Sept. 30, 1924.  1,510,368
S. G. WINGQUIST
HYDRAULIC COUPLING AND CHANGE SPEED GEAR
Filed July 14, 1922   2 Sheets-Sheet 2

Inventor:
Sven Gustaf Wingquist
By his Attorneys,
Fraser, Dirk & Myers

Patented Sept. 30, 1924.

1,510,368

UNITED STATES PATENT OFFICE.

SVEN GUSTAF WINGQUIST, OF GOTTENBORG, SWEDEN.

HYDRAULIC COUPLING AND CHANGE-SPEED GEAR.

Application filed July 14, 1922. Serial No. 575,027.

*To all whom it may concern:*

Be it known that I, SVEN GUSTAF WING-QUIST, a subject of the King of Sweden, residing at Gottenborg, in the Kingdom of Sweden, have invented new and useful Improvements in Hydraulic Couplings and Change-Speed Gears, of which the following is a specification, reference being had to the drawings accompanying and forming a part thereof.

This invention relates to a hydraulic coupling and change speed gear working according to the differential principle and comprising a driving rotor, a driven rotor and a stator consisting of one or more elements.

The chief object of the present invention is to secure a smooth change from one transmission ratio to another and to utilize the energy of movement stored in the stator element or elements.

The invention consists, primarily, in the stator element or elements being so arranged that, in direct drive that is to say when the corresponding pump element is cut out, said stator element or elements are automatically released and rotate with the driving rotor, whereas, when the corresponding pump element is thrown into action, said stator element or elements gradually obtain a decreased speed of rotation and, thereby, impart their energy of movement to the driving rotor. The stator element or elements are suitably arranged in such manner that, when their absolute speed is zero, they are automatically prevented from turning in the direction opposite to the direction of rotation of the driving rotor.

Figure 1:
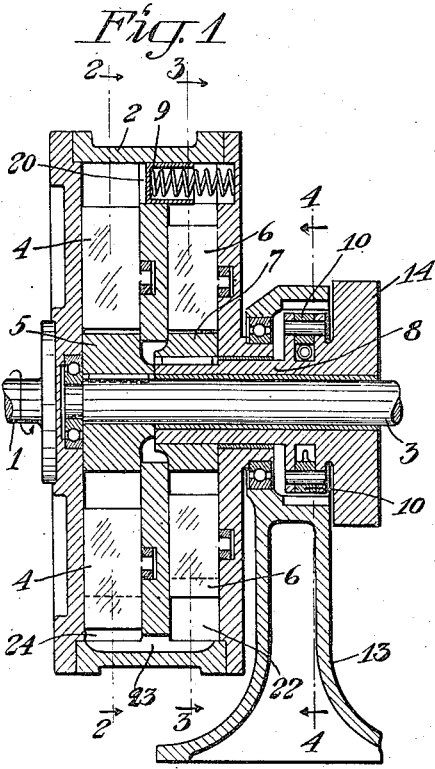
Figure 2:
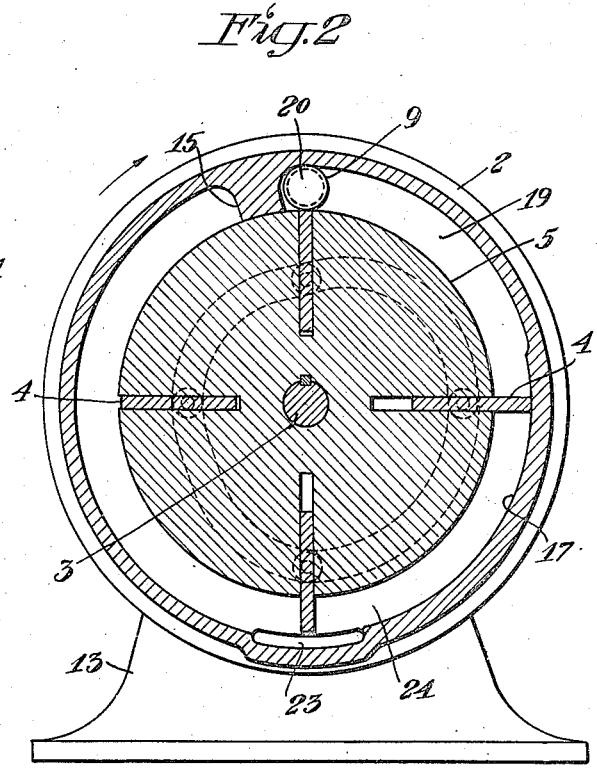
Figure 3:
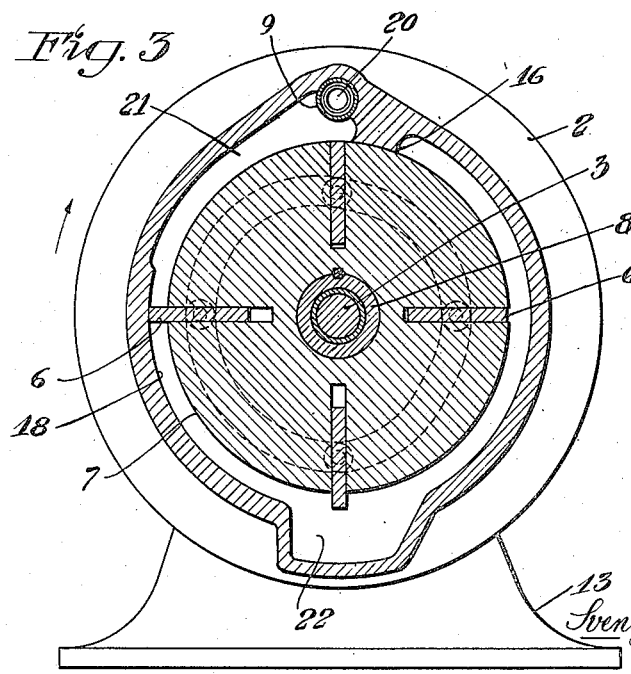
Figure 4:
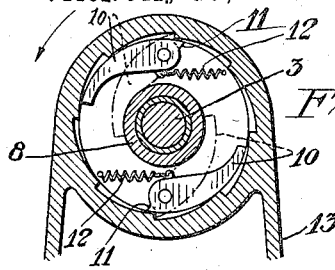
Figure 5:
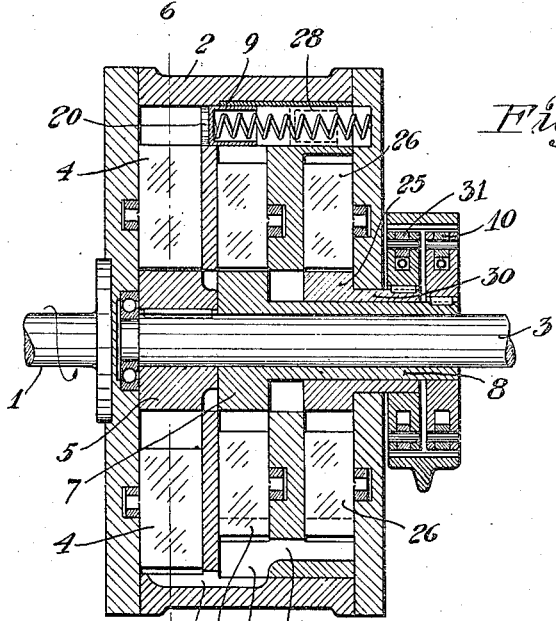
Figure 6:
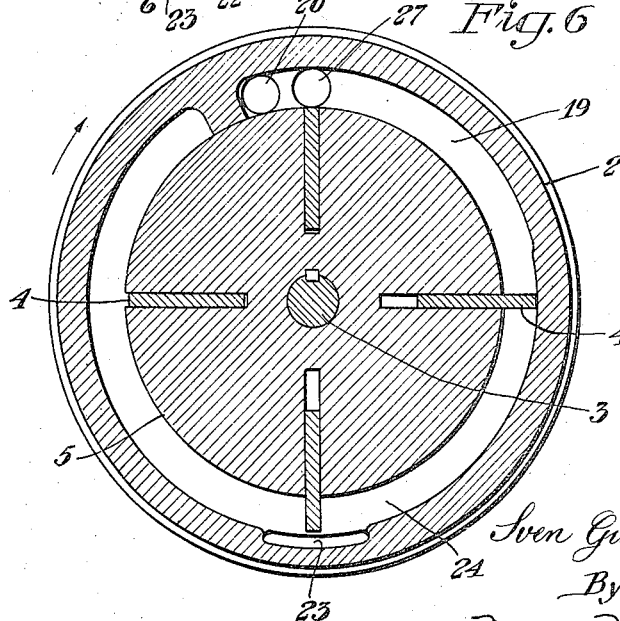

In the drawings, two forms of embodiment of a hydraulic coupling and change speed gear according to the invention are illustrated by way of example. Fig. 1 is an axial section of the device. Fig. 2 is a transverse section taken along the line 2—2 of Fig. 1 viewed in the direction of the arrows. Fig. 3 is a circular section taken along the line 3—3 of Fig. 1. Fig. 4 is a section along the line 4—4 of Fig. 1 viewed in the direction of the arrows. Fig. 5 is a view similar to Fig. 1, but showing a gear having two receiving pumps. Fig. 6 is a transverse section taken along the line 6—6 of Fig. 5 viewed in the direction of the arrows.

Referring to the drawings, the hydraulic coupling and change speed gear consists of two pumps 2, 5 and 2, 7 of the ordinary sliding vane type having abutments 15, 16 and working faces 17, 18 respectively, the pump 2, 5 being a delivery pump and pump 2, 7 a receiving pump. In the structure disclosed, 1 is the driving shaft which is rigidly connected to the outer casing 2, which functions as the driving rotor. Journaled in the said casing is a driven shaft 3, and keyed to the said shaft 3 is a rotor 5 having radially movable vanes 4, said rotor constituting the driven rotor. Within the casing 2 is, further, a stator 7 having radially movable vanes 6, said stator being keyed to a sleeve 8 adapted to turn relatively to the driven shaft 3. Between the pressure chambers 19 and 21 respectively of the two sliding vane pumps 2, 5 and 2, 7 is a passage 20 in which is a piston valve 9, actuated directly by the liquid in the pressure chamber 19 of the pump 2, 5 so that, at a certain predetermined pressure in the said chamber, i. e. at a certain predetermined turning moment of the driven shaft 3, said piston valve automatically establishes communication between the pressure chambers of the pumps 2, 5 and 2, 7 so as to establish a transmission ratio, whereas, at any lower pressure in the chamber 19, said valve 9 is moved by spring action to a position in which the passage between the pressure chambers is cut off and a direct drive established. In the embodiment shown in Figs. 1 to 4, the sleeve 8 carrying the body portion 7 of the stator is provided, at or near its outer end, with two pivoted arms 10, each having a pawl 11 adapted to be brought, by the action of a spring 12, into engagement with corresponding recesses in a frame 13. When the sleeve rotates, the pawls 11 are disengaged from the recesses by centrifugal force acting on the arms 10. As herein shown, the outer end of the stator sleeve 8 is formed as a flywheel 14 having a relatively great mass, the energy of which may be utilized in overcoming large or sudden increases in load.

The device described operates as follows: Supposing the driving shaft 1 with the casing 2 to be rotated in the direction of the arrow (Figs. 2 and 3) and the load on the driven shaft 3 to be small, the shaft 3 will be driven, by the liquid trapped in the pump 2, 5, with the same speed as the shaft 1 there being, under these conditions, no escape from said pump for the fluid. The stator 7 with the sleeve 8 is also rotated by the movement of casing 2 acting on fluid trapped in pump 2, 7 and the arms 10, which, at rest, occupy the positions shown by dotted lines (Fig. 4), are caused by the centrifugal force to move outward, against the action of the springs 12, into the positions shown by full lines. If the load on the shaft 3 be then increased, the pressure in the pump element 2, 5 is also increased, and the valve 9 opens the passage between the pressure chambers 19 and 21 respectively of the pumps 2, 5 and 2, 7 so as to establish a transmission ratio between the shafts. When the said passage is opened, a pressure will, obviously, arise in the receiving pump 2, 7 and exert a braking action on the rotating stator 7 so that the latter will gradually obtain a reduced speed and, through the medium of the pressure liquid, give off its energy of movement to the driving rotor 2. Due to the gradually decreasing speed of the stator, the coupling in or the change from direct drive to a transmission ratio will thus take place smoothly, and the energy stored in the stator 7 and the flywheel mass 14 will be utilized for driving purposes instead of being consumed in braking, in that, the braking action of the stator 7 will afford a reaction force on the abutment 16 which is then transmitted through the rotor body 2 and the fluid in the chamber 19 to the driven rotor 5, the fluid delivered from the delivery pump 2, 5 to the receiving pump 2, 7 escapes through the chamber 22 and channel 23 to the suction side 24 of chamber 19, a circulation of the fluid taking place between the two pumps. The absolute speed of the stator 7 finally approaches zero, the centrifugal force on the arms 10 thus vanishes, and the arms are caused by the action of the springs 12, to move inwardly into the positions shown by dotted lines (Fig. 4), in which the pawls 11 engage the recesses in the frame 13. The stator 7 is thus prevented from moving in the direction opposite to the direction of rotation of the rotor 2, and the ratio of gearing between the shafts 1 and 3 will thus be directly dependent on the volumetric capacities of the two pumps. On the other hand, if the load on the shaft 3 should decrease, the pressure in the delivery pump 2, 5 will also decrease, and, at a certain pressure, the valve 9 will shut off the passage 20 between the pressure chambers 19 and 21 respectively of the two pumps so as to establish direct drive. The stator 7 is then again rotated in the direction of the arrow in Fig. 4.

In the form of embodiment shown in Figs. 5 and 6 there is an additional stator element 25 having sliding vanes 26 and forming together with the driving rotor 2 a second receiving pump connected to the pressure chamber 19 of the delivery pump 2, 5 through a pressure channel 27 having a spring-actuated valve 28 and through a channel 29, the chamber 22 and the channel 23 to the suction side 24 of said delivery pump 2, 5. Secured to the free end of the sleeve-shaped portion 30 of the stator body 25 there is a pawl and ratchet device 31, similar to the device 10, 11 secured to the sleeve 8. Otherwise, the change speed gear is identical with that shown in Figs. 1 to 4, the stator body 25 being, of course, rotatable with relation to the sleeve 8 carrying the stator 7.

Also the action of the change speed gear according to Figs. 5 and 6 is identical with that above described with the difference only that, if the valve 9 opens the passage 20 between the delivery pump 2, 5 and the first receiving pump 2, 7 at a certain pressure, the valve 28 will open the passage 27 between the delivery pump 2, 5 and the second receiving pump 2, 25 at a somewhat higher pressure, the stator bodies 7 and 25 being checked independently.

The invention is, obviously, not limited to the forms of embodiment shown in the drawings, since various changes may be made therein without departing from the spirit of the invention.

I claim:

1. A hydraulic coupling and change speed gear comprising a delivery pump and at least one receiving pump and a valve-controlled passage between the delivery pump and the receiving pump, said hydraulic coupling and change speed gear comprising a driving rotor, a driven rotor, and a stator, one of said rotors being common to both the delivery pump and the receiving pump, means for automatiaclly releasing the stator so as to rotate freely with the common rotor, when the said valve-controlled passage is closed, and means for permitting the stator to automatically obtain a gradually decreased speed of rotation, when opening said valve-controlled passage, so that the change from one step of coupling to another will take place smoothly and the energy of movement stored in the stator will be utilized.

2. A hydraulic coupling and change speed gear according to claim 1, having means for automatically preventing the stator from turning in a direction opposite to the direction of rotation of the common rotor.

3. A hydraulic coupling and change speed gear according to claim 1, having a ratchet device for automatically preventing the stator from turning in a direction opposite to the direction of rotation of the common rotor.

4. A hydraulic coupling and change speed gear according to claim 1, in which the stator is provided with an additional flywheel mass.

5. A hydraulic coupling and change speed gear according to claim 1, wherein the pumps are of the sliding vane type and are co-axially arranged.

In testimony whereof I have signed my name.

SVEN GUSTAF WINGQUIST.